Reissued May 5, 1936

Re. 19,953

UNITED STATES PATENT OFFICE 19,953

PROCESS OF MANUFACTURING NITROUS OXIDE

Walter Friederich, Troisdorf, Germany

No Drawing. Original No. 1,896,945, dated February 7, 1933, Serial No. 337,530, February 4, 1929. Application for reissue August 17, 1933, Serial No. 685,636. In Germany April 27, 1928

3 Claims. (Cl. 23—158)

This invention relates to the production of nitrous oxide from ammonium nitrate, and in particular relates to the overcoming of drawbacks in that process wherein ammonium nitrate or a mixture of sodium or potassium nitrate and ammonium sulphate are heated, or ammonium nitrate either in solid form or in the form of a solution is continuously introduced into the vessel used for the decomposition; and the vessel may contain a fused molten salt, for example a mixture of sodium nitrate and potassium nitrate as well as ammonium sulphate, and is continuously maintained at or above the decomposition temperature of ammonium nitrate. These processes have the drawback, that the decomposition of ammonium nitrate according to the equation $NH_4NO_3=N_2O+2H_2O$ is accompanied by secondary reactions, by which nitrogen as well as nitrous oxide and other nitric oxides, NO, $N_2O_3$, $NO_2$, are produced. Furthermore by partial dissociation, free nitric acid is produced. The nitric oxides and the nitric acid are corroding the material of the jar and the production of nitrous oxides is reduced more and more and finally decrepitations may be caused by the decomposition. The nitric oxides contained in the mixture require purification of the nitrous oxide.

Now I have found that these drawbacks may be avoided by the admixture of a small amount of ammonia with the ammonium nitrate or to the mixture of ammonium sulfate and sodium or potassium nitrate. This amount of ammonia may be added either in gaseous form and is then bubbled through the reaction mass or as a constituent of a solution of ammonium nitrate which is to be used. By this addition of a small amount of ammonia the formation of nitric oxide, nitrogen dioxide and free nitric acid is considerably reduced or if there is enough ammonia is entirely avoided and the reaction mass is kept neutral or slightly ammoniacal. The output of nitrous oxide is greatly increased. Besides nitrous oxide and water only a very small amount of nitrogen is produced. By adding about 0.7 to 1.4 parts of $NH_3$ to 100 parts of ammonium nitrate it is easy to realize an output of 96–98% of the theoretical estimate.

In connection with the general processes of making nitrous oxide by the decomposition of ammonium nitrate, temperatures of 230 to 300° C. have been mentioned in the art as temperatures at which to carry on the decomposition of the ammonium nitrate. It is obvious that in such processes the ultimate desire is the proper decomposition of the ammonium nitrate, and the consequent use of a temperature sufficient for that purpose. The application of the present improvement to these general processes need not affect observance of these general considerations.

In addition to this improvement of the output the further advantage is attained that the material of the jar is not at all or very slightly corroded, and especially the danger of decrepitations and explosions is avoided. The purification of the nitrous oxide becomes a very simple process in consequence of the absence of the nitric oxide and nitrogen dioxide.

The reaction jars are suitably made of acid proof alloys like stainless steel or enameled material.

The starting materials being either nitrate of ammonium or sulphate of ammonium and nitrate of potassium or sodium, their reaction produces nitrate of ammonium and the sulphate of potassium and sodium.

The nitrate of ammonium may preferably be filled into the reaction jar as an aqueous solution, so that the process may be made continually in this way. It is very advantageous first to fill the reaction jar with a solution or admixture of salts such as an admixture of sodium or potassium nitrate. The reaction jar may be heated electrically or by a gas burner.

What I claim as new and my invention and desire to secure by United States Letters Patent is:

1. The process of manufacture nitrous oxide from ammonium nitrate which comprises heating the ammonium nitrate to its decomposition temperature in the presence of a small amount of ammonia, an aqueous solution of ammonium nitrate, containing free ammonia, being added continuously in an amount sufficient to replace the ammonium nitrate decomposed.

2. The process of manufacturing nitrous oxide, which comprises heating ammonium nitrate to its decomposition temperature in the presence of free ammonia, present in the order of about 1.4% of the ammonium nitrate.

3. The process of manufacturing nitrous oxide from ammonium nitrate, which comprises heating the ammonium nitrate to its decomposition temperature in the presence of a small amount of ammonia, ammonium nitrate and free ammonia being added continuously in an amount sufficient to replace the ammonium nitrate decomposed.

WALTER FRIEDERICH.